May 6, 1941.  P. M. BOURDON  2,240,542
TIRE
Filed July 27, 1935  2 Sheets-Sheet 1
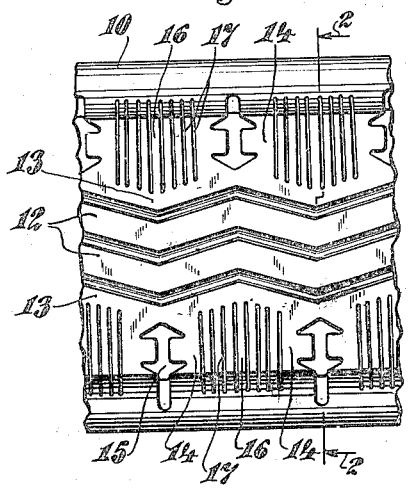
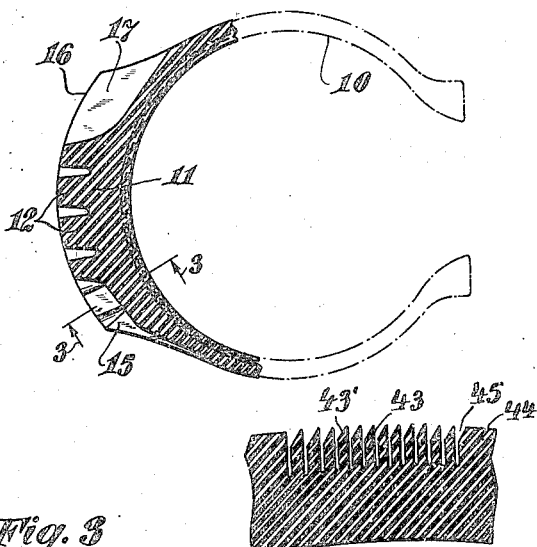
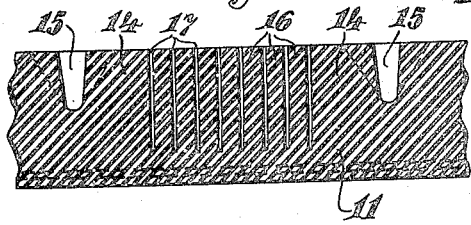
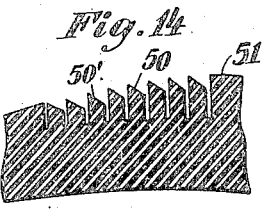
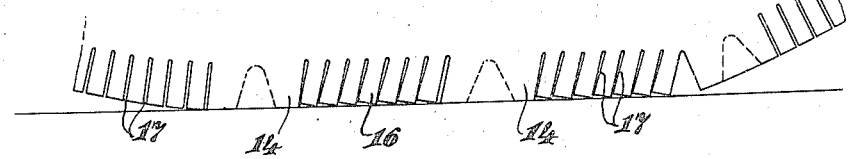
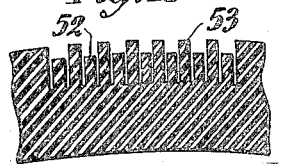
INVENTOR.
Pierre Marcel Bourdon,
BY Hoguet, Neary & Campbell,
HIS ATTORNEYS Patented May 6, 1941

2,240,542

UNITED STATES PATENT OFFICE 2,240,542

TIRE

Pierre Marcel Bourdon, Paris, France, assignor to Michelin & Cie, Clermont-Ferrand, France, a corporation of France Application July 27, 1935, Serial No. 33,434
In France September 29, 1934

13 Claims. (Cl. 152—209)

The present invention relates to vehicle tires and embodies, more specifically, an improved tire construction by means of which the non-skid and wearing qualities are greatly improved over those of tires now available. More particularly, the invention contemplates the provision of a tire, the non-skidding properties of which are materially improved over those now available, such characteristic being secured without weakening the tread band of the tire. Moreover, it is proposed to secure this non-skidding characteristic throughout the entire life of the tire.

It has been known, heretofore, to form slits in the tread of tires, such slits having been formed by a cutting tool which cuts directly into the tire. It has been found that the use of a cutting tool in the above manner produces a tendency, in the portion of the tire so cut, to tear and thus impair the life and serviceability of the tread. The cutting tool used to produce the slits never cuts a smooth and even surface through the rubber, but on the contrary, produces little breaks in the contexture of the rubber. These breaks are the points where tearing starts and thus impair the life and serviceability of the tread. Furthermore, the tearing off of a rib of rubber will cause adjacent ribs to become quickly torn by reason of the excessive strain imposed thereon. As a result, the destruction of a rib means the prompt destruction of the portion of the tread involved.

Moreover, if the slits are cut sufficiently far into the tread of the tire, excessive strain on the tire frequently results in tearing of the tread entirely down to the fabric or foundation layers. Where the slits are formed by molding, the bottoms thereof are rounded, thus avoiding any sharp angles and resulting points of strain and stress from which tearing starts.

Inasmuch as the foregoing disadvantages are present when tires are cut, present practice requires that the cuts which form slits in the tread of the tire be limited in depth, thus reducing the efficacy of the slits and necessitating repeated cutting during the life of the tire, as the tread wears down.

In accordance with the present invention, it has been found that relatively deep and narrow grooves in the tread of a tire function effectively to produce a very substantial traction-producing engagement as well as a means for setting up effective resistance against lateral motion of the tire under stresses which tend to put the tire into a skid. Furthermore, the separate deep ribs of rubber formed by the slits cause a wiping action to take place which results in forcing out the water which might exist on the roadway, thus producing a comparatively dry traction surface between the tire and the roadway.

In studying the problems involved in the manufacture of tires with slits formed therein and the operating problems thereof, it has been found that the life of the tread is greatly prolonged by molding, rather than cutting, the slit formation therein. When the slits are molded, it has been found that there results less tendency to tear and, as a result, the depth of the slits may be greatly increased and properties imparted to the tread, as a result thereof, which are not attainable with relatively shallow slits. Moreover, by molding operations instead of cutting to form the slits, all forms of profiles may be formed by the slits, thus increasing the resistance of the tire to lateral skidding, whereas only straight lines are obtainable with a cutting tool.

The attainment of the foregoing objects and advantages is accomplished, in the specific form of the invention shown and described herein, by the provision of sections in the tread band of the tire, each section being formed of a plurality of slits extending from a central, longitudinal and relatively rigid tread member to one side of the tread band and positioned between relatively rigid parallel blocks which limit the flexing or collapsing action of the ribs of rubber between the slits. In this construction, the relatively rigid blocks serve as an abutment for the ribs and limit the angle and elongation of such ribs under compression and traction efforts, the positional relationship of each section of ribs between the rigid blocks giving various advantageous characteristics, including an increased resistance against tearing, side skidding, a cleaning action on the road surface, and a relatively greater gripping or traction effect between the tire and road surface.

Further advantages and adaptations of the inventive concept will be apparent to those skilled in the art and reference will now be made to the accompanying drawings, wherein Figure 1 is a plan view of a portion of the tread band of a tire constructed in accordance with the present invention;

Figure 2 is a transverse view in section, taken on the line 2—2 of Figure 1 and looking in the direction of the arrows;

Figure 3 is a view in section, taken on the line 3—3 of Figure 2 and looking in the direction of the arrows;

Figure 4 is a diagrammatic illustration of the action of the tread members of a tire constructed in accordance with the present invention, when such tire is subjected to normal operating stresses, this view illustrating the function of the blocks 14 in remaining perpendicular to the road bed, a condition which exists because of their comparatively great rigidity.

Figures 12, 13 and 14 show the invention embodied in a tire, the tread surface of which consists of a plurality of thin ribs;

Figure 15 shows a variation of the invention in which the thin ribs are alternately longer than adjacent ribs to produce a series of stepped traction surfaces.

Figure 5:
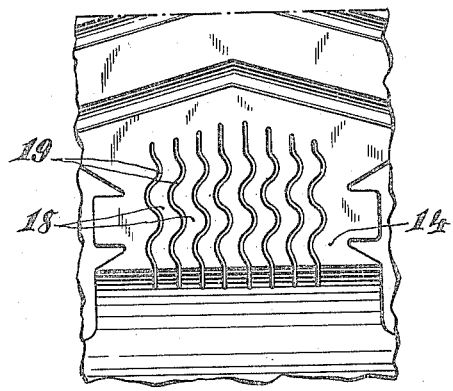
Figure 5 is an enlarged partial view of a modified form of tread formation constructed in accordance with the present invention.

Referring to Figures 1, 2, 3 and 4 of the drawings, a tire 10 is shown as formed with a tread band 11, in the central plane of which one or more relatively rigid tread members 12 are formed of suitable form. In the construction shown, these tread members are of zigzag formation in order that traction may be facilitated. Upon opposite sides of the central members 12, tread sections 13 are formed, these sections extending inwardly to the central members 12 and outwardly adjacent to the edge of the tread band 11. The sections 13 are limited longitudinally by relatively rigid blocks 14, the adjacent blocks of adjacent tread sections being spaced by suitably formed grooves 15.

Each tread section is composed of a plurality of ribs 16 which are spaced by means of slits 17 which are molded in the tread surface. The slits 17 are preferably of considerable depth and may, if desired, extend through substantially the entire thickness of the tread band and adjacent the supporting layer upon which the band is molded. Inasmuch as the slits are molded, the surface forming the same is continuous and free from tears or corners which are formed by cutting tools. As a result, there is no tendency, during service, for these slits to tear or to yield to deleterious stresses to which they are subjected during service.

When the tread of the tire is subjected to compression and driving stresses, the tread sections which are so subjected assume the position illustrated in the diagrammatic illustration of Figure 4. Inasmuch as the ribs 16 are relatively flexible, the compressive stresses cause them to collapse and partially close the slits separating them. One of the end ribs, under such condition, lies against the adjacent relatively rigid block 14 and thus the block 14 serves as a support to maintain the ribs in the position illustrated in Figure 4. In such condition, the edges of the ribs engage the road surface and materially improve the traction of the tire. Moreover, inasmuch as the ribs are anchored to the adjacent central longitudinal tread member 12, the resulting profile of the ribs under pressure will follow a curve extending from the central portion outwardly and away from a plane transverse to the tread band. This position of the ribs produces a wiping or squeezing action which forces water from the central portion of the tread band outwardly and thus produces a relatively dry surface beneath the tire. It will be seen that the blocks 14 provide rigid abutments to prevent the ribs from flattening out to such an extent that they would not grip the ground and would be badly torn in service. Were these blocks not present, the ribs, being numerous and relatively thin, would collapse and the foregoing condition exist.

Because of the relative movement between the ribs 16, a scavenging action takes place therebetween, thus preventing the accumulation of stones and other foreign matter.

A further advantage of the foregoing construction resides in the fact that the curved profile of the ribs under compression presents a greater and more effective friction surface which resists side skidding of the tire. This action may be increased by forming the ribs with a curved profile, as shown in Figure 5. In the construction shown in this figure, fluted slits 19 are provided, thus resulting in a construction which not only resists, more effectively, the accumulation of foreign matter between the ribs, but also presents a more effective surface to resist side skidding of the tire and is more resisting to tearing. Inasmuch as the tread is formed by a molding operation, the slits may be formed of any profile, a circumstance which is not possible when the slits are formed by cutting operations.

Figure 6:
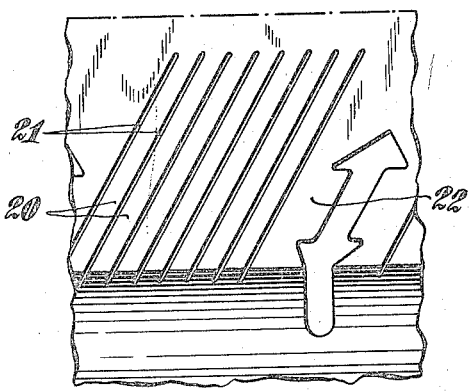
Figure 6 is a view similar to Figure 5, showing a further modification of the invention.

A further modification of the invention is shown in Figure 6 wherein ribs 20 are formed by angular slits 21 positioned between relatively rigid block portions 22 which function similarly to the block portions 14 in the construction shown in Figures 1 and 5.

Figure 7:
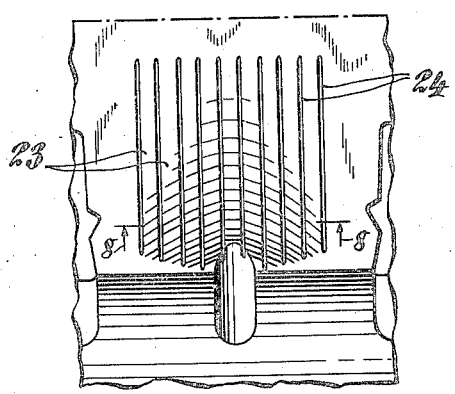
Figure 7 is a view similar to Figure 5 showing the invention embodied in a further tread formation.

Figure 7 illustrates a further adaptation of the invention wherein the tread sections may include ribs 23 which are raised slightly from the plane of the tread band and spaced by slits 24. This construction functions similarly to the forms of the invention previously described.

Figure 9:
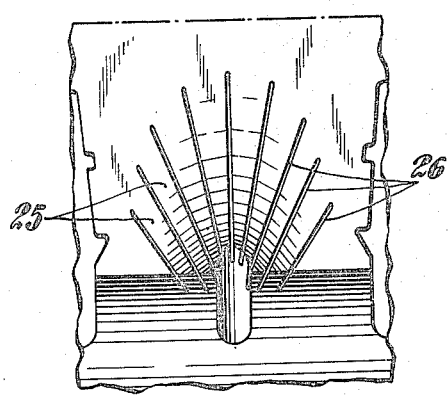
Figure 9 is a view similar to Figure 5 showing a still further modification of the invention.
Figure 8:
Figure 8 is a view in section taken on the line 8—8 of Figure 7 and looking in the direction of the arrows.

In Figure 9 a tread formation has been shown in which the present invention is embodied, the tread sections being formed of a plurality of radiating ribs 25 which are spaced by similarly radiating slits 26. Here, again, the ribs function in the manner previously described and the construction results in increased resistance to side skidding.

Figure 10:
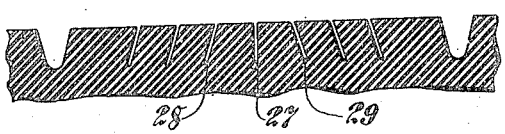
Figure 10 is a sectional view showing a modified form of tread construction in which the slits slant in one or more predetermined directions.

In Figure 10 a tread formation has been shown embodying the present invention, the slits lying in planes at angles to perpendiculars to tangents to the surface of the tire at the points of intersection thereof, these slits thus slanting in one or more directions as desired. For example, slit 27 may be formed perpendicular to the surface of the tire, while slits 28 on one side of slit 27 may slant upwardly and to the right, and slits 29 on the other side of the slit 27 may slant upwardly and to the left.

Figure 11:
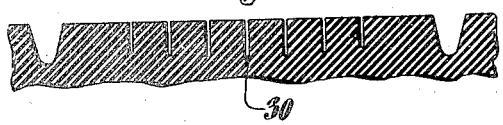
Figure 11 is a view showing a further modification of the invention wherein the depth of the slits varies.

In Figure 11 a further modified form of the invention is shown in which the slits 30 in the tread sections may be of varying depth.

In designing the tread construction above described, certain considerations are involved in forming a satisfactory tread. While the ribs must be flexible in order that a scraping or resisting action may take place upon the road surface, they must not be so thin as to be readily torn and to pick up foreign matter. Moreover, if the ribs are too thin, they become too flexible to resist skidding. In actual practice it has been found that the thickness of the ribs or the spacing of the slits should be between three and eight millimeters. The actual width of the slits, in satisfactory commercial embodiments of the invention, have been found to be between the limits of two-tenths of a millimeter and eight-tenths of a millimeter. If the slits are less than two-tenths of a millimeter, the play between the ribs is too small to permit proper flexing of the rubber ribs, this flexing being indispensable to the sharpening of the edges of these columns through wear. If the width of the slits exceeds eight-tenths of a millimeter, the ribs are too flexible and are too easily torn from the tread. Moreover, stones are readily trapped between the ribs and the tire is apt to be cut. A further disadvantage resides in the fact that there results an increased wear because the ribs are too highly mobile.

A further characteristic of a satisfactory embodiment of the invention, as illustrated in the accompanying drawings, lies in the fact that the length of the slits is controlled in order that proper rigidity may be preserved in the central portion of the tread band. If the slits are extended too close to the central section of the tread, tearing thereof results under certain conditions whereas, if the length of the slits is too little, the anti-skidding effect is, in large measure, lost. In actual practice it has been found that the most suitable length of the slits is between one-fifth and two-fifths of the width of the tread band. Moreover, as illustrated in the accompanying drawings, the length of the slits in each tread section may vary. It has been found that the depth of the slits may be extended to within two millimeters of the bottom of the tread layer and the slits are therefore preferably of a depth between one-half the thickness of the tread layer and the thickness of the tread layer minus two millimeters.

A further consideration in the design of the tread is the amount of tread surface occupied by the laterally extending supporting blocks 14. These blocks should be sufficiently rigid and stiff to support the flexing ribs 16 and prevent them from being torn. In practice, the width of such block should be one and one-half to three times the width of a rib 16. However, if the slits are not very deep or if the tread is strongly ribbed, the thickness of the blocks 14 may be reduced.

An additional advantage resulting from the specific construction shown in Figures 1 and 5 is that by forming the central tread members 12 of zigzag formation, the transverse stiffness thereof is increased, as well as the adherence thereof to the road surface. Moreover, by forming the central members of zigzag profile and extending the slits 17 into the reentrant angles formed thereby, the slits 17 may be carried further toward the central plane of the tread band, thus increasing the anti-skidding properties of the tread.

In the construction shown in Figure 12, the tread band is formed with a plurality of relatively thin and flexible ribs 43 having sloping surfaces 43' terminating in a common plane. In this form, a series of thin ribs 43 are positioned between relatively rigid abutments 44, upon one of which an adjacent corner may be cut away as shown at 45.

In the form shown in Figure 13 relatively thin ribs 46 may be formed with sloping surfaces 47 positioned between relatively rigid abutments 48 having cutaway portions 49 to facilitate the action of the scraping surfaces of the ribs 46.

In the form of the invention shown in Figure 14, the relatively thin ribs 50 terminate in scraping edges 50', being positioned between abutments 51 as in the constructions shown in Figures 12 and 13.

In the form of the invention shown in Figure 15, a plurality of thin ribs 52 and 53 are provided, the length of these ribs differing to form alternately long and short members. In this fashion, the corners of the ribs 53 function as scraping surfaces during service.

Obviously, the abutments or relatively rigid ribbed members may be formed with smooth surfaces or surfaces which are striated, grooved, etc. Moreover, the planes of the ribs or scraping surfaces may be at any angle with respect to the tread band or parallel thereto and may be formed either by molding when the tire is originally manufactured or by the addition of new rubber when a tire has been partially used.

From the foregoing it will be seen that a tread formation has been provided by means of which the gripping or traction effect of the tire may be greatly increased, at the same time imparting the qualities of long wear and relatively great resistance of the tire to lateral skidding. The action of the ribs during operation is such as to increase the anti-skidding effect thereof inasmuch as the ribs are sharpened along one edge due to the flexing thereof. A further advantage in the tread construction of the present invention resides in the lack of any tendency in the tread formations to tear or to have foreign matter lodged therein. While the invention has been described with reference to the specific construction shown in the accompanying drawings, it is not to be limited save as defined in the appended claims.

I claim:

1. A vehicle tire having a central primary load carrying wearing tread portion having protuberances thereon substantially inflexible circumferentially thereof, and tread sections on opposite sides of the central tread portion comprising relatively rigid supporting blocks spaced circumferentially and a plurality of flexible ribs disposed between said supporting blocks and extending outwardly from the central tread member.

2. A vehicle tire having a central wearing tread portion having protuberances thereon substantially inflexible circumferentially thereof, and tread sections on opposite sides of the central tread portion comprising rigid supporting blocks spaced circumferentially and a plurality of highly flexible ribs of greater height than width disposed between said supporting blocks and extending outwardly from the central tread member.

3. A vehicle tire having a central tread portion extending circumferentially thereof, a plurality of highly flexible tread ribs extending outwardly from the central tread member, said ribs being of greater height than width and being spaced one from another by grooves which are of less width than the ribs, and relatively rigid supporting blocks for groups of said ribs spaced circumferentially.

4. A vehicle tire having moulded in its surface a plurality of highly flexible ribs of greater height than width disposed angularly with respect to the median plane of the tire, said ribs being flexible laterally and longitudinally under deforming stresses while capable of sustaining loads without collapsing, and relatively rigid tire portions between which said flexible ribs are disposed.

5. A vehicle tire formed with a relatively inflexible central primary load carrying wearing tread portion and having moulded in its surface on opposite sides of the central tread portion a plurality of highly flexible ribs of greater height than width disposed angularly with respect to the median plane of the tire, said ribs being disposed between relatively inflexible portions of the tire and flexible laterally and longitudinally under deforming stresses while capable of sustaining loads without collapsing.

6. A vehicle tire formed with a relatively rigid central primary load carrying wearing tread portion and having moulded in its surface on opposite sides of the central tread portion, a plurality of laterally extending highly flexible ribs of greater height than width, said ribs being flexible laterally and longitudinally under deforming stresses while capable of sustaining loads without collapsing.

7. A vehicle tire formed with a relatively rigid central primary load carrying wearing tread portion and having moulded in its surface on opposite sides of the central tread portion a plurality of highly flexible ribs of greater height than width extending from the edges of the tread band of the tire towards the central tread portion of the tire.

8. A vehicle tire having moulded in its surface a plurality of closely spaced highly flexible ribs of greater height than width, said ribs being of sinuous form longitudinally and flexible laterally and longitudinally under deforming stresses while capable of sustaining loads without collapsing, and relatively rigid tire portions between which said sinuous ribs are disposed.

9. A vehicle tire having moulded in its surface spaced groups of highly flexible ribs of greater height than width, the ribs in each group being of different lengths and flexible laterally and longitudinally under deforming stresses.

10. A vehicle tire having moulded in its surface a plurality of highly flexible ribs of greater height than width extending angularly from the edges of the tread band toward the central portion of the tire for a distance substantially equal to not less than one-fifth and not more than two-fifths of the width of the tread band.

11. A vehicle tire having moulded in its surface a plurality of highly flexible ribs of greater height than width disposed angularly with respect to the median plane of the tire and comprising only a portion of the load carrying tread band, the tread ends of the ribs in contact with the ground having sharp edges, engageable with the road surface, and said ribs being flexible laterally and longitudinally under deforming stresses while capable collectively of sustaining the loads to which they are subjected without collapsing.

12. A vehicle tire having moulded in its surface a plurality of highly flexible ribs of greater height than width, disposed angularly with respect to the median plane of the tire and comprising only a portion of the load carrying tread band, some of said ribs being of greater height than others and all of said ribs being flexible laterally and longitudinally under deforming stresses while capable collectively of sustaining the loads to which they are subjected without collapsing.

13. A vehicle tire having moulded in its surface a plurality of closely spaced highly flexible ribs of greater height than width disposed angularly with respect to the median plane of the tire and comprising only a portion of the load carrying tread band, said ribs being flexible laterally and longitudinally under deforming stresses while capable collectively of sustaining the loads to which they are subjected without collapsing.

PIERRE MARCEL BOURDON.